(12) United States Patent  (10) Patent No.: US 8,739,134 B2
Baron  (45) Date of Patent: May 27, 2014

(54) VALGRIND SUPPRESSIONS FILE EDITOR

(75) Inventor: Elliott Baron, Mississauga (CA)

(73) Assignee: Red Hat, Inc., Raleigh, NC (US)

( * ) Notice: Subject to any disclaimer, the term of this patent is extended or adjusted under 35 U.S.C. 154(b) by 882 days.

(21) Appl. No.: 12/612,561

(22) Filed: Nov. 4, 2009

(65) Prior Publication Data

US 2011/0107309 A1  May 5, 2011

(51) Int. Cl.
*G06F 9/44* (2006.01)
*G06F 9/445* (2006.01)

(52) U.S. Cl.
USPC .......................................... 717/128; 717/111

(58) Field of Classification Search
None
See application file for complete search history.

(56) References Cited

U.S. PATENT DOCUMENTS

2007/0250492 A1* 10/2007 Angel et al. ...................... 707/4
2010/0083225 A1*  4/2010 Giat ............................. 717/111

OTHER PUBLICATIONS

Kapo $C_{++}$, Feb. 25, 2007, http://kap-cpp.blogspot.com.*

* cited by examiner

*Primary Examiner* — Hyun Nam
(74) *Attorney, Agent, or Firm* — Lowenstein Sandler LLP

(57) ABSTRACT

A computer-implemented method involving detecting a creating or opening of a suppression file presenting a suppression edits, executing an auto complete search in response to input to define a suppressions and storing the suppression file to be utilized with a profiling tool to hide data defined by the suppression file.

20 Claims, 4 Drawing Sheets

VALGRIND SUPPRESSIONS FILE EDITOR

TECHNICAL FIELD

The embodiments of the invention relate to an integrated development environment. Specifically, the embodiments of the invention relate to an integrated development environment with an integrated editor for suppression files.

BACKGROUND

An integrated development environment (IDE) provides a set of tools such as editing and debugging software for programmers. These tools are utilized to create and to debug new software programs. The IDE supports software development by providing a windowed system for source file editing, project management, file interdependency management and debugging. ECLIPSE®, by the Eclipse Foundation, is an IDE for C and C++ development on the LINUX® platform. ECLIPSE® uses a plug-in based software model where all the components of the IDE are structured as plug-ins for the IDE.

There are many other types of programming tools that are not part of an IDE and are used on a stand-alone basis. One example of a stand-alone tool is VALGRIND™. VALGRIND™ is a profiling utility that provides a suite of tools for monitoring system performance. Another example of a stand-alone profiling tool is OPROFILE™. OPROFILE™ is a profiling utility for the LINUX® platform that provides another suite of profiling tools. The tools include a cache miss counter, a cache stall counter, a memory fetch counter and an additional set of profilers that can profile interrupt handlers and kernels. The tools of VALGRIND™ and OPROFILE™ are typically command line tools that generate simple flat output files. These output files often contain more information than is desired by a user. Suppression files can be utilized to define a set of information to be excluded from an output file or from display from an output file.

BRIEF DESCRIPTION OF THE DRAWINGS

Embodiments of the invention are illustrated by way of example and not by way of limitation and the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
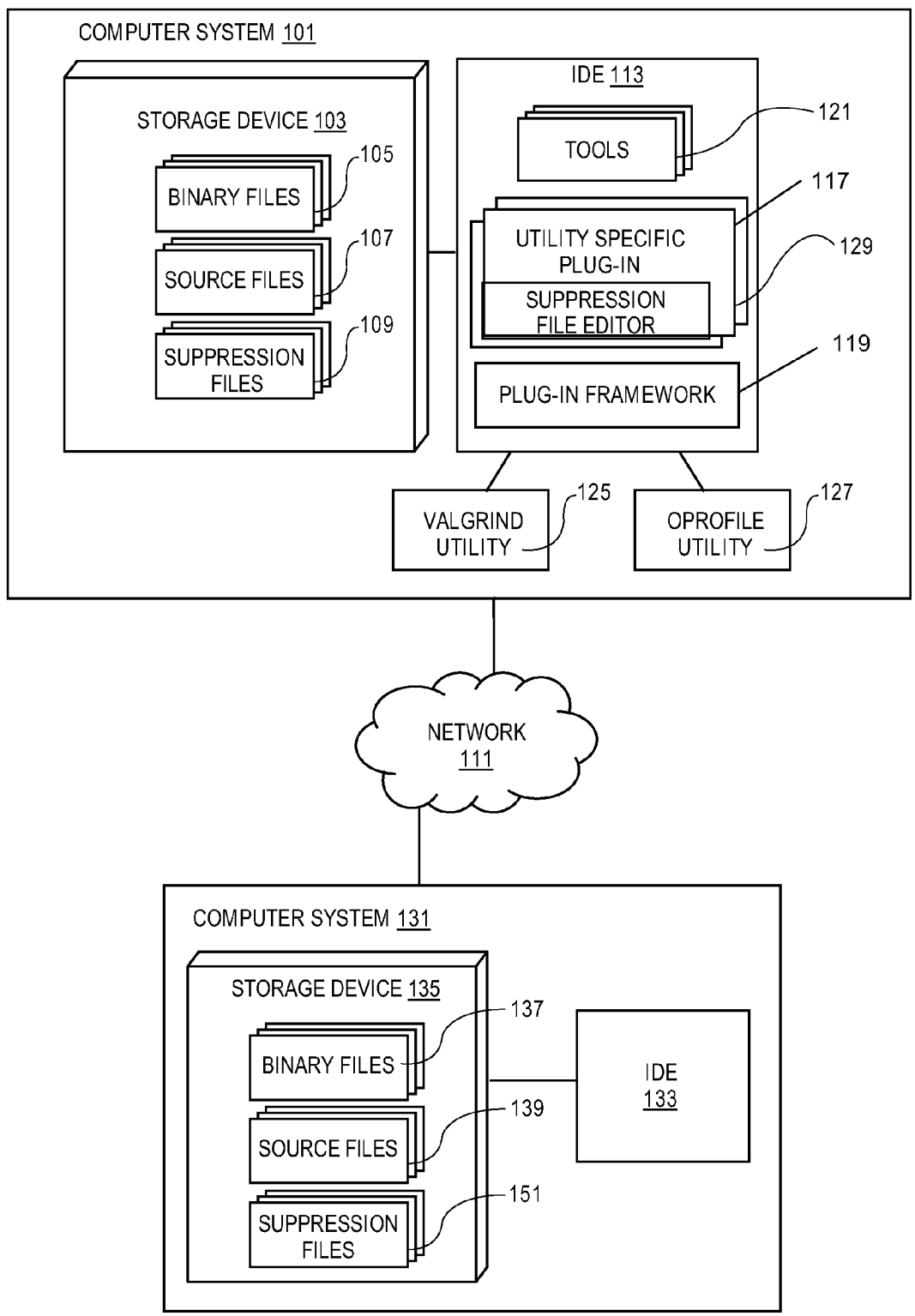
FIG. 1 is a diagram of one embodiment of a computer system that provides a suppression editor in an integrated development environment.

FIG. 1 is a diagram of one embodiment of a system for suppression file editing in an integrated development environment. In one embodiment, a computer system 101 implements a set of tools 121, a set of utility specific functions 117 including a suppression file editor 129, a plug-in framework 119 and includes a storage device 103, an integrated development environment (IDE) 113 and a set of stand-alone utilities 125, 127. In another embodiment, the IDE 113 and the suppression file editor 129 are a part of a distributed system.

In the distributed system embodiment, the computer system 101 communicates over a network 111 with a remote computer system 131. The distributed system can include any number of additional computer systems 131. For sake of clarity, a distributed embodiment with the single additional computer system 131 is described. One skilled in the art would understand that any number of additional computer systems could be included in a distributed system that incorporate similar features, functions and structures.

The computer system 101 can be any type of computing device including a desktop computer, a workstation, a dedicated server, a handheld device or a similar computing device. The network 111 can be a local area network (LAN), a wide are network (WAN), such as the Internet, or a similar communication system. The network 111 can include any number of intermediate computing devices and network elements between the communicating computer systems 101, 131. The network 111 can include any number or combination of wired and wireless communication mediums between the nodes in the network. Other computer systems 131 can also be any type of computing device including a desktop computer, a workstation, a dedicated server, a handheld computer system or similar computing device.

The computer system 101 can include any type and number of storage devices 103. The storage devices 103 can be fixed disk drives, removeable storage medium drives that are external or internal drives, random access memory (RAM), static memory or similar storage devices. The storage devices 103 can be used to store a set of binary files 105, source files 107, and suppression files 109, as well as, installed programs and tools including the IDE 113 and stand-alone utilities 125, 127. The binary files 105 and source files 107 are data files that are part of a programming project managed by the IDE 113. The binary files 105 are compiled code generated from the source files 107. The source files 107 are sets of program instructions in a high level computer language like C or C++. A 'set,' as used herein refers to any positive whole number of items including one item. The suppression files 109 are code in any structured format or language that defines a set of data to be suppressed for a particular stand-alone utility 125, 127 or tool 121.

The IDE 113 is an application for assisting a user in managing a software programming project. The IDE 113 assists in the management of source files 107 and binary files 105, program compiling, source file editing and similar tasks associated with software development. In one embodiment, the IDE 113 is the ECLIPSE® IDE. The IDE 113 can have a set of integrated tools or plug-ins 121. These tools 121 assist the user in debugging, editing, compiling or similarly managing the project. In one example embodiment, the tools 121 are plug-ins that operate in conjunction with a set of utility specific general purpose or intermediate plug-ins or functions 117 and a general purpose framework plug-in or component 119.

For example, the framework plug-in or component 119 can be a profiling framework for providing a set of functions relating to program execution profiling. The profiling framework can support interfacing with external utilities such as a VALGRIND™ utility 125 or OPROFILE™ utility 127 or similar programs. The framework plug-in or component 119 defines a set of functions that provide access to data structures and resources of the IDE to plug-ins of the integrated development environment. A set of utility specific general purpose functions 117 for interfacing with each external program can also be defined. For example, a VALGRIND™ specific set of functions can be provided through a plug-in 117. The set of functions can include a suppression file editor 129 that provides a user interface and set of functions for creating and managing a set of suppression files that define the information that is to be suppressed for a corresponding tool 121 or utility 125, 127.

Different sets of tools 121 can then be provided that are specific to each of the external utilities and allow the user to interface with the functionality of those external utilities within the integrated development environment 113. The tools 121 receive a selection of a binary that a user wants to process and utilize the framework plug-in or component 119 and utility specific functions 117 to call an external utility. The framework plug-in or component 119 and utility specific functions 117 return the output of the external utility. The tools 121 can then process this output data to generate a data model and display the data from the output to the user. The specific examples of the suppression file editor 129, VALGRIND™ 125 utility, the profiling framework 119, and the utility specific functions 117, are provided by way of example. One skilled in the art would understand that the structures, functions, and principles described in regard to these specific examples are applicable to any external utility that can be integrated and provided through a visual interface within the IDE 113, through a similar software structure, set of general function and tools and that may produce data that a user does not desire to have displayed. In further embodiments, the framework 119, utility specific functions 117 and tools 121 can be integrated into a monolithic plug-in or directly integrated into the IDE 113. Other permutations of these configurations are also within the scope of the invention.

The external utilities 125, 127 are stand-alone utilities. These external utilities 125, 127 are command line programs for use on the LINUX® platform. The plug-ins of the IDE 113 enable the interfacing of the IDE 113 with these external utilities 125 and the utilization of the output of these utilities within the IDE 113 environment. The framework plug-in or component 119 in combination with the utility specific functions 117, and tools 121 enable interfacing with the functionality of these external utilities 125 in the IDE 113 environment as an integrated visual experience. Further, the tools 121 may enable an integration with the source code 107 and the output of the external utilities 125, 127.

In a distributed computing environment, a remote computer system 131 can be used to provide access to additional binary files 137, source files 139 and suppression files 151 on the storage device 135 within the computer system 131. One of ordinary skill in the art would understand that any combination of resources can be provided over a network 111 by a computer system 131 to a user of an IDE 113 on the computer system 101. Similarly, the user of a computer system 131 and IDE 133 on that computer system 131 can interact with and utilize resources from the computer system 101 over the network 111. In this manner, the distributed computing environment enables the use of resources across the network 111 that allow a user of an IDE 113, 133 to access a larger range of resources that are distributed across each of the computer systems 101, 131.

Figure 2:
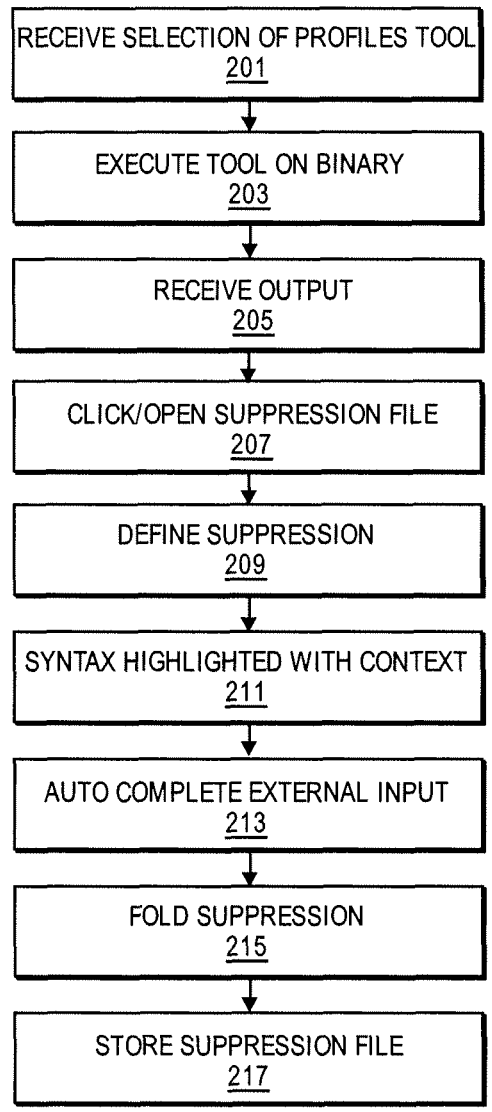
FIG. 2 is a diagram of one embodiment of a process for suppression file editing.

FIG. 2 is a diagram of one embodiment of a process for providing a suppression file editor. The use of the suppression file editor may come in response to the use of a profiling tool where the profiling tool generates output with superfluous or unwanted values or data. The profiling tool can be initiated by selecting the profiling tool from a menu of the integrated development environment (Block 201). The profiling tool is then executed on a specified binary file (Block 203). The profiling tool may rely on an external utility that is called by utility specific functions or framework functions. The output of the profiling tool is then provided to the user (Block 205). The data can be received from the external utility as a standard output file, pathname for the file or through a similar process. This output may include more data than is desired by the user such that it obstructs the user's ability to identify the data relevant to the user.

In response to receiving an unusable or difficult to utilize output, the user can open a suppression file editor for the specific profiling tool or the specific binary that were utilized to generate the output (Block 207). In other embodiments, the suppression file editor is generic to all tools or utilities. The selection of the suppression file editor initiates the execution of the suppression file editor in a window or similar user interface of the integrated development environment. The suppression file editor can be available as a menu option or through a similar user interface mechanism of the integrated development environment. The selection of the suppression file editor can be coupled with the specification of an existing suppression file or indication that a new suppression file is to be generated. In another embodiment, these options are specified after the tool is executed.

In the suppression file editor, the user can define data to suppress by using the syntax of the suppression files that is specific to the profiling tool or the integrated development environment (Block 209). The user defines a set of data that is to be suppressed in the output of the profiling tool or specific binary. In one embodiment, the suppressed data is not shown or is only shown after it is expanded from a hidden or compressed state or similarly selected. In a further embodiment, the suppressed data is not be collected by the associated external utility or the data is collected but not stored with the other data that is collected. An example of a suppression file is a suppression file used in connection with a VALGRIND™ utility or more specifically the memcheck tool of the VALGRIND™ utility. In this context, the user defines the specific memcheck functions that are to be suppressed or suppressed in the context of specific files or functions. Suppression files are loaded by the integrated development environment or by the tool or utility and utilized during the execution and analysis of the binary to prevent the display of the specified data or to prevent the collection of that data.

If an existing suppression file is opened or if a new suppression file is being created, the suppression file editor parses the existing or created suppression definitions to highlight terms within their specific context. For example, a specific function for a suppression can be highlighted by the terms or keywords of the function or the variables or parameters of the functions can be highlighted (Block 211). This highlighting is context specific such that the terms are only highlighted when they are syntactically utilize in the same way. Thus, if a memcheck term in a suppression file is specifying a function to which a suppression is to be applied it will be highlighted in the same manner for each utilization in the same context. However, if the term memcheck is utilized in a different context, for example, as part of a name of a file or path name, then it will not have the same characteristics as the highlighted memcheck terms as it utilized in another context. The automated highlighting function thus identifies syntactic use of each term that is analyzed and provides identical highlighting characteristics to each context type or syntactic usage along with the keyword search to identify like terms.

During the editing or defining of suppressions, in the suppression file an auto-complete operation is continuously executed (Block 2013). Auto-complete performs a keyword search over a partially input term being defined to find matches with previously input terms or a range of possible parameters given the syntactic position within the suppression that a user is editing. A menu, pop-up or similar user interface mechanism of possible completions is provided in which the user can select by keystroke or peripheral input device one of the suggested auto-completions to utilize.

The editor also analyzes the suppression file to identify each suppression definitions and to provides a user interface mechanism during the display of the defined suppressions that allows the user to fold or expand the suppression definitions to enable the user to easily navigate and see the suppression that has been defined (Block 215). The folding and expanding user interface mechanism can be any icon or keystroke or similar user interface mechanism. The icon or related user interface element can also indicate a current state of the suppression definition.

After the user has completed the editing of the suppression file, the suppression file is then stored (Block 217). The suppression file will be automatically stored in a location that is known to the associated utility such that it will be opened and executed when the associated tool of binary is next analyzed.

Figure 3:
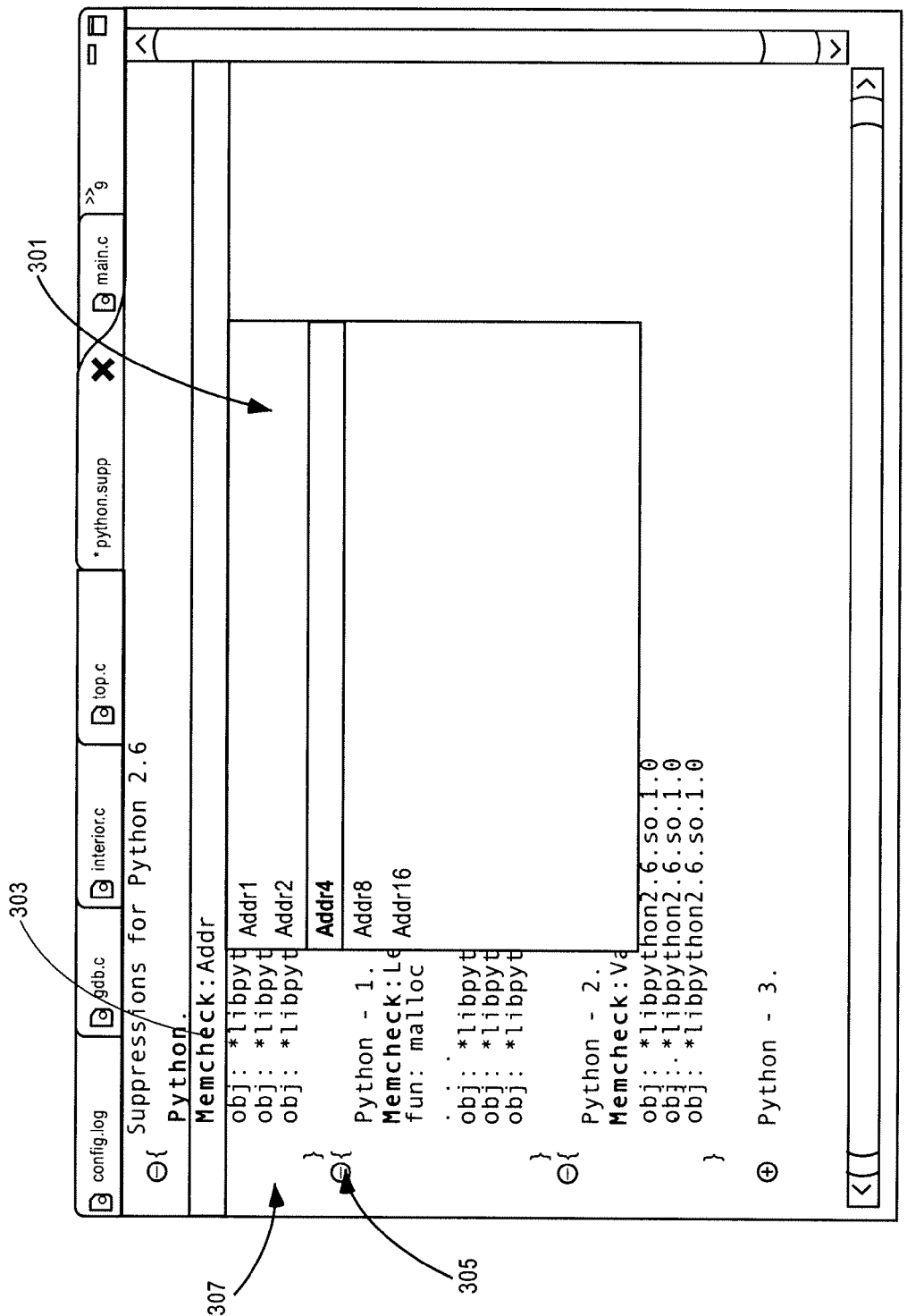
FIG. 3 is a diagram of one embodiment of a user interface for a suppression file editor.

FIG. 3 is a diagram of one embodiment of the user interface of the suppression file editor. The file editor may be provided through a window mechanism or similar user interface mechanism. The suppression file editor displays each suppression definition 307 within the file. Each suppression definition is parsed to identify identical terms in identical contexts. These terms 303 are then highlighted or similarly marked in an identical fashion. Each definition is also given an expand/collapse or folding user interface mechanism 305. This folding user interface mechanism 305 allows the user to minimize or collapse each definition to show only the name or similar information about the definition and to hide the other details of the definition to enhance the readability and navigation of the suppression file.

As a user edits or adds parameters, terms or elements to a suppression definition, the suppression file editor presents an auto-completion window 301. The auto-completion window provides a set of possible term, element or parameter completions based on a matching of the partial input. The auto-completion window is navigable by peripheral input or by keystroke. Any number of possible completions can be displayed simultaneously and the possible completions can be offered in response to any length of input.

Figure 4:
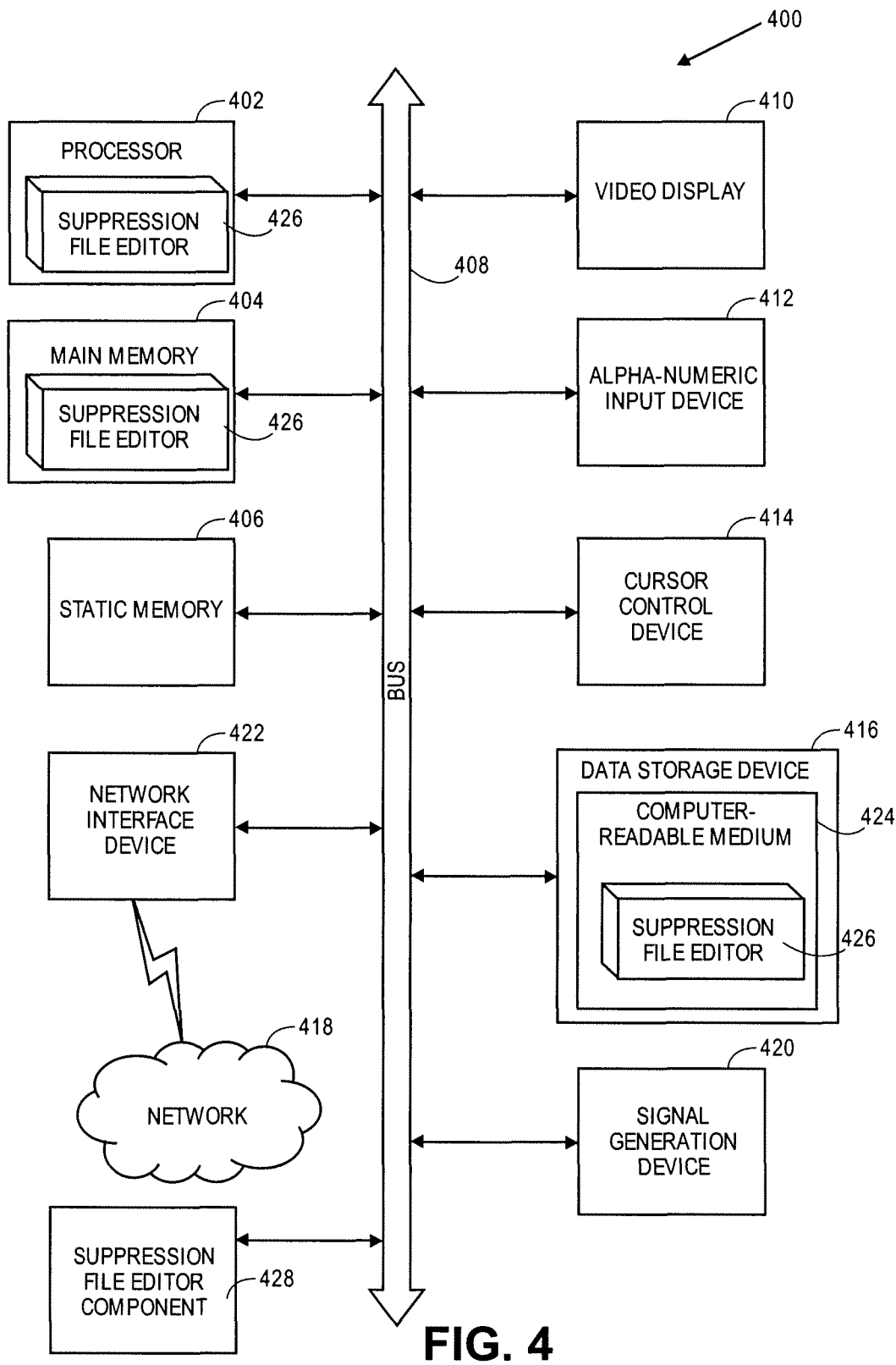
FIG. 4 is a diagram of one embodiment of a computer system for implementing an suppression file editor.

FIG. 4 is a diagram of one embodiment of a computer system implementing the suppression file editor. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine (e.g., a client computer executing the desktop management program and the server computer executing the a remote application) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, or dynamic random access memory (DRAM) such as synchronous DRAM (SDRAM), etc.), a static memory 406 (e.g., flash memory, static random access memory (SRAM), etc.), and a secondary memory 416 (e.g., a data storage device in the form of a drive unit, which may include fixed or removable computer-readable medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the suppression file editor 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the suppression file editor 426) embodying any one or more of the methodologies or functions described herein. The desktop manager 426 may also reside, completely or at least partially, within the main memory 404 and/or within the processing device 402 during execution thereof by the computer system 400, the main memory 404 and the processing device 402 also constituting machine-readable storage media. The suppression file editor 426 may further be transmitted or received over a network 418 via the network interface device 422.

The machine-readable storage medium 424 may also be used to store the suppression file editor 426 persistently. While the machine-readable storage medium 426 is shown in an exemplary embodiment to be a single medium, the term "machine-readable storage medium" and also "computer-readable medium" should be taken to include a single medium or multiple media (e.g., a centralized or distributed database, and associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

The suppression file editor 426 can also be a discrete component 428 that performs the functions described herein. The suppression file editor component 428 can be any type of special purpose or programmed device in communication with the computer system over the bus or through a network connection.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantifies and are merely convenient labels applied to these quantities. Unless specifically stated otherwise as apparent from the above discussion, it is appreciated that throughout the description, discussions utilizing terms such as "detecting," "presenting," "executing," "storing," "highlighting," "attaching," "hiding," "folding,"or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for a suppression file editor has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting at least one of a creating or an opening of a suppression file;
   presenting, by a processing device, a suppression file editor for editing the suppression file, wherein the suppression file editor provides a user interface and a set of functions to edit the suppression file;
   executing, by the processing device, an auto-complete search in response to receiving input via the user interface of the suppression file editor to define a suppression of a memory check function in the suppression file; and
   storing the suppression file to be utilized with a profiling tool to hide data defined by the suppression file in output of the profiling tool.

2. The method of claim 1, further comprising:
   highlighting syntax and context of the suppression in the suppression file editor.

3. The method of claim 1, further comprising:
   storing the suppression in the suppression file; and
   attaching the suppression file to a profiling tool.

4. The method of claim 1, further comprising:
   hiding data that meets the suppression file definition including a keyword and context.

5. The method of claim 1, wherein the suppression file editor is part of an integrated development environment.

6. The method of claim 1, wherein the profile tool is a VALGRIND™ profile tool.

7. The method of claim 1, further comprising:
   folding suppression definition data in the suppression file editor.

8. The method of claim 5, wherein the integrated development environment is an ECLIPSE™ integrated development environment.

9. A non-transitory computer-readable storage medium having stored therein a set of instructions that, when executed by a processing device cause the processing device to:
   detect at least one of a creating or an opening of a suppression file;
   present, by a processing device, a suppression file editor for editing the suppression file, wherein the suppression file editor provides a user interface and a set of functions for editing the suppression file;
   execute, by the processing device, an auto-complete search in response to receiving input via the user interface of the suppression file editor to define a suppression of a memory check function in the suppression file; and
   store the suppression file to be utilized with a profiling tool to hide data defined by the suppression file in output of the profiling tool.

10. The non-transitory computer-readable storage medium of claim 9 wherein the processing device is further to:

highlight syntax and context of the suppression in the suppression file editor.

11. The non-transitory computer-readable storage medium of claim 9 wherein the processing device is further to:
store the suppression in the suppression file; and attaching the suppression file to a profiling tool.

12. The non-transitory computer-readable storage medium of claim 9 wherein the processing device is further to:
hide data that meets the suppression file definition including a keyword and context.

13. The non-transitory computer-readable storage medium of claim 9, wherein the suppression file editor is part of an integrated development environment.

14. The non-transitory computer-readable storage medium of claim 9, wherein the profile tool is a VALGRIND™ profile tool.

15. The non-transitory computer-readable storage medium of claim 9 wherein the processing device is further to:
fold suppression definition data in the suppression file editor.

16. The non-transitory computer-readable storage medium device of claim 13, wherein the integrated development environment is an ECLIPSE™ integrated development environment.

17. A system comprising:
a memory to store a suppression file; and
a processing device, connected to the memory, to:
detect at least one of a creating or an opening of a suppression file;
present a suppression file editor for editing the suppression file, wherein the suppression file editor provides a user interface and a set of functions for editing the suppression file;
execute an auto-complete search in response to receiving input via the user interface of the suppression file editor to define a suppression of a memory check function in the suppression file; and
store the suppression file to be utilized with a profiling tool to hide data defined by the suppression file in output of the profiling tool.

18. The system of claim 17, wherein the suppression file editor automatically generates auto-complete options for the input to define the suppression.

19. The system of claim 17, wherein the suppression file editor is part of an integrated development environment.

20. The system of claim 17 further comprising the profiling tool, wherein the profiling tool is a VALGRIND™ profiling tool.

* * * * *